(12) United States Patent
Lugert et al.

(10) Patent No.: US 11,826,000 B2
(45) Date of Patent: Nov. 28, 2023

(54) DOMESTIC DISHWASHER

(71) Applicant: BSH Hausgeräte GmbH, Munich (DE)

(72) Inventors: Michael Lugert, Jettingen-Scheppach (DE); Bernd Eisenbart, Holzheim (DE); Bernd Heisele, Sontheim (DE); Anton Oblinger, Wertingen (DE); Werner Oblinger, Mödingen (DE)

(73) Assignee: BSH Hausgeräte GmbH, Munich (DE)

( * ) Notice: Subject to any disclaimer, the term of this patent is extended or adjusted under 35 U.S.C. 154(b) by 234 days.

(21) Appl. No.: 17/427,937

(22) PCT Filed: Jul. 16, 2020

(86) PCT No.: PCT/EP2020/070101
§ 371 (c)(1),
(2) Date: Aug. 3, 2021

(87) PCT Pub. No.: WO2021/018608
PCT Pub. Date: Feb. 4, 2021

(65) Prior Publication Data
US 2022/0047145 A1 Feb. 17, 2022

(30) Foreign Application Priority Data
Jul. 31, 2019 (DE) ...................... 10 2019 211 410.5

(51) Int. Cl.
| A47L 15/22 | (2006.01) |
| A47L 15/42 | (2006.01) |
| F16H 57/02 | (2012.01) |

(52) U.S. Cl.
CPC ............... *A47L 15/22* (2013.01); *A47L 15/42* (2013.01); *A47L 15/4202* (2013.01);
(Continued)

(58) Field of Classification Search
None
See application file for complete search history.

(56) References Cited

U.S. PATENT DOCUMENTS

2004/0074527 A1 4/2004 Sato et al.
2017/0143180 A1 5/2017 Dries

FOREIGN PATENT DOCUMENTS

| CN | 204445754 U | 7/2015 |
| CN | 105286747 A | 2/2016 |

(Continued)

OTHER PUBLICATIONS

Seyfettin et al., "DE102009007297A1 English Machine Translation. pdf", Aug. 12, 2010—Machine translation from Espacenet.com.*

(Continued)

*Primary Examiner* — Levon J Shahinian
(74) *Attorney, Agent, or Firm* — Michael E. Tschupp; Andre Pallapies; Brandon G. Braun

(57) ABSTRACT

A household dishwasher includes a washing container holding a dishwasher load, and a spray arm for applying washing liquor and/or fresh water to the dishwasher load. The spray arm is mounted for rotation about an axis of rotation and is actively driven by a drive entity. The drive entity includes a drive shaft mounted for rotation about an axis of rotation which extends in parallel relation to and at a distance from the axis of rotation of the spray arm.

30 Claims, 4 Drawing Sheets

(52) U.S. Cl.
CPC ......... *A47L 15/428* (2013.01); *A47L 15/4225* (2013.01); *A47L 15/4246* (2013.01); *F16H 2057/02069* (2013.01)

(56) References Cited

FOREIGN PATENT DOCUMENTS

| CN | 106618429 A    | 5/2017 | |
|----|----------------|--------|--|
| CN | 208898627 U    | 5/2019 | |
| DE | 102009007297 A1 * | 8/2010 | ............. A47L 15/22 |
| EP | 1090579 A1     | 4/2001 | |
| EP | 2233057 A1     | 9/2010 | |
| WO | 2013132458 A1  | 9/2013 | |
| WO | 2013132459 A1  | 9/2013 | |

OTHER PUBLICATIONS

National Search Report DE 10 2019 211 410.5 dated Apr. 29, 2020.
International Search Report PCT/EP2020/070101 dated Sep. 22, 2020.
Non-Final Office Action, U.S. Appl. No. 17/413,021, filed Apr. 13, 2023, 7 pages.

\* cited by examiner

DOMESTIC DISHWASHER

CROSS-REFERENCES TO RELATED APPLICATIONS

This application is the U.S. National Stage of International Application No. PCT/EP2020/070101, filed Jul. 16, 2020, which designated the United States and has been published as International Publication No. WO 2021/018608 A1 and which claims the priority of German Patent Application, Serial No. 10 2019 211 410.5, filed Jul. 31, 2019, pursuant to 35 U.S.C. 119(a)-(d).

BACKGROUND OF THE INVENTION

The present invention relates to a household dishwasher.

A dishwasher comprises a washing container in which a dishwasher load that requires to be cleaned can be held. A rotating spray arm for applying washing liquor and/or fresh water to the dishwasher load can be provided within the washing container. This spray arm can be driven either by means of the pressure of washing liquor and/or fresh water emerging from spray nozzles of the spray arm, or by means of an active drive, in particular with the aid of an electric motor. In this case, the drive can be arranged such that an axis of rotation thereof corresponds to an axis of rotation of the spray arm.

BRIEF SUMMARY OF THE INVENTION

Taking this as a point of departure, one object of the present invention is to provide an improved household dishwasher.

A household dishwasher is proposed accordingly, having a washing container, a spray arm for applying washing liquor and/or fresh water to a dishwasher load that is held in the washing container, and a drive entity for actively driving the spray arm. In this case, an axis of rotation of a drive shaft of the drive entity and an axis of rotation of the spray arm are arranged parallel to each other and at a distance from each other.

As a result of the axis of rotation of the drive shaft and the axis of rotation of the spray arm being arranged at a distance from each other, a drive element of the drive entity can be arranged at a distance from the spray arm. This means that the washing liquor and/or fresh water flowing from a circulating pump of the household dishwasher to the spray arm does not experience any deflection and, in contrast with a direct drive, the spray arm itself can be kept free of elements that are required for the drive. This allows a simple structure of the household dishwasher and, in comparison with a direct drive of the spray arm, offers hydraulic advantages.

The washing container is preferably cuboid. In particular, the washing container comprises a bottom, a top which is situated opposite the bottom, a door, a rear panel which is situated opposite the closed door, and two side panels. Dishwasher loading racks for holding the dishwasher load can be provided in the washing container. For example, an upper basket, a lower basket and a cutlery drawer are provided. The spray arm can be arranged below the lower basket. In particular, the spray arm can be rotatably mounted at the bottom. Alternatively, the spray arm can also be arranged between the lower basket and the upper basket.

"Applying" washing liquor and/or fresh water to the dishwasher load is understood in this context to mean that the dishwasher load is wetted with washing liquor and/or fresh water by means of the spray arm. "Washing liquor" can be understood in this context to mean water to which a detergent has been added. The washing liquor can also contain soiling that has become detached from the dishwasher load. The spray arm being "actively" driven is understood in this context to mean that the drive entity applies a rotational moment to the spray arm. Therefore an "active" drive in this context must in particular not be understood to mean that the spray arm is caused to rotate by means of spray nozzles. In order to actively drive the spray arm, the drive entity comprises a drive element, in particular an electric motor, which causes the drive shaft to rotate. The axis of rotation of the spray arm and the axis of rotation of the drive shaft being arranged "at a distance from each other" is understood in this context to mean that the two axes of rotation are so arranged as to be separated from each other by a distance. This means that the axis of rotation of the drive shaft and the axis of rotation of the spray arm in particular do not correspond to each other.

According to an exemplary embodiment, the spray arm has an extension piece which is actively driven by means of the drive entity, and a spray arm satellite which is rotatably mounted on the extension piece and is reactively driven by the washing liquor and/or the fresh water.

The extension piece preferably comprises a conical supporting tube and e.g. two arms. The supporting tube and the arms are hollow, such that washing liquor and/or fresh water can flow from the supporting tube into the arms. The arms can optionally have spray nozzles. The arms can however also be free of spray nozzles. The spray arm satellite is preferably not actively driven, but is caused to rotate by means of washing liquor and/or fresh water emerging from spray nozzles that are provided on the spray arm satellite. "Reactively driven" in this context means that the washing liquor and/or the fresh water is discharged from the spray nozzles of the spray arm satellite, whereby this is caused to rotate. Provision can also be made for special driving spray nozzles. The spray arm satellite can have a plurality of arms. The spray arm satellite preferably comprises three arms, these being offset by 120° relative to each other. However, the spray arm satellite can also have only two arms.

According to a further embodiment variant, the drive entity comprises a gearbox for transferring rotational moment from the drive shaft to the spray arm.

The gearbox is preferably a preassembled module, which can easily be assembled for the purpose of coupling the drive shaft to the spray arm. The gearbox can be referred to as a transmission module or transmission unit.

According to a further embodiment variant, the gearbox comprises straight-cut or helical cog-wheels, a bevel gear, a belt drive or a chain drive.

The gearbox can in principle comprise any possible type of rotational moment transfer that is suitable for bridging the distance between the axis of rotation of the drive shaft of the drive entity and the axis of rotation of the spray arm.

According to a further embodiment variant, the gearbox comprises a plurality of cog-wheels, which bridge a distance between the drive shaft and the spray arm.

In particular, the distance between the axis of rotation of the drive shaft and the axis of rotation of the spray arm is measured. The number of cog-wheels is in principle unlimited. The gearbox preferably has a transmission ratio of approximately 1. For example, provision can be made for three cog-wheels. However, provision can equally be made for only one cog-wheel, two cog-wheels, four cog-wheels or more than four cog-wheels.

According to a further embodiment variant, the gearbox comprises a transmission housing in which the cog-wheels are held.

The transmission housing is preferably composed of plastic injection-molded components. The transmission housing can have mounting eyelets by means of which the transmission housing can be connected to a sump of the household dishwasher.

According to a further embodiment variant, the cog-wheels are rotatably mounted in the transmission housing. Axles are preferably provided in the transmission housing for this purpose. The axles can be e.g. cylindrical bolts or pins which are held in the transmission housing.

According to a further embodiment variant, the transmission housing comprises an upper housing part and a lower housing part, said upper housing part being positively connected to the lower housing part.

The upper housing part and the lower housing part are preferably plastic injection-molded components. A positive connection is produced by means of the interlocking, or catching, of at least two connection partners, namely the upper housing part and the lower housing part in this case. For example, snap-in hooks can be provided on the upper housing part, said hooks being suitable for snapping into corresponding seats of the lower housing part and thus positively connecting the upper housing part and the lower housing part. By this means, the transmission housing can also be disassembled easily again.

According to a further embodiment variant, the transmission housing is fluid-permeable.

"Fluid-permeable" in this context means that a fluid, in particular washing liquor and/or fresh water, can flow though the transmission housing. Soiling of the cog-wheels can be prevented thereby, since the washing liquor and/or fresh water flowing through can rinse any soiling out of the transmission housing. To this end, the transmission housing preferably has suitable outlet openings through which the washing liquor and/or the fresh water can exit from the transmission housing.

According to a further embodiment variant, the household dishwasher also comprises a filter system below which the gearbox is arranged.

As a result of this, the gearbox is protected against coarse dirt at least. This prevents food remnants reaching the gearbox or the cog-wheels. The gearbox is preferably arranged between the sump and the filter system. The filter system can be a multipart system and can comprise a fine filter and a coarse filter, for example.

According to a further embodiment variant, the household dishwasher also comprises a sump on which the spray arm is mounted and to which the drive entity is fastened.

In particular, the spray arm is rotatably mounted on the sump. The drive entity can be screwed onto the sump, e.g. with the aid of the mounting eyelets provided on the transmission housing. To this end, the sump can have suitable locating sections for receiving screws. The sump is preferably a plastic injection-molded component.

According to a further embodiment variant, the spray arm comprises a spray arm toothed gear into which the drive entity positively engages for the purpose of transferring rotational moment.

The spray arm toothed gear is preferably provided on the supporting tube. In particular, the spray arm toothed gear is positioned on the outside of the supporting tube. The spray arm toothed gear can be straight-cut or helical, for example. The spray arm toothed gear preferably comprises a multiplicity of teeth, these being distributed uniformly around a circumference of the supporting tube, in particular externally. The spray arm toothed gear is preferably designed as a single piece with the supporting tube, said piece being materially integral in particular. "Single piece" in this context is understood to mean that the supporting tube and the spray arm toothed gear form a common component and are not composed of different components. "Materially integral" in this context means that the spray arm toothed gear and the supporting tube are manufactured entirely from the same material. The arms of the extension piece are manufactured from e.g. polypropylene (PP), in particular glass-fiber reinforced. By contrast, the supporting tube can be manufactured from polyoxymethylene (POM). Therefore the supporting tube can also be referred to as a POM supporting tube or POM supporting part. This means that the supporting tube and the arms can be manufactured from different plastic materials. For example, the arms and the supporting tube can be permanently connected together in a plastic injection molding process with encapsulation of the various plastic materials.

According to a further embodiment variant, the sump comprises a tubular sump dome, in or on which the spray arm is rotatably mounted, wherein the sump dome has a radial aperture via which the drive entity can positively engage into the spray arm for the purpose of transferring rotational moment.

The sump preferably comprises a plate-like base section to which the gearbox is fastened. The sump dome extends out from said plate-like base section as a single piece and is materially integral in particular. The sump dome is tubular, wherein the aperture penetrates a wall of the sump dome in a radial direction of the sump dome, so that a cog-wheel of the gearbox can engage into the spray arm toothed gear. This means that the cog-wheel of the gearbox passes through the aperture and thus engages positively into the spray arm toothed gear.

According to a further embodiment variant, the spray arm comprises at least one cleaning nozzle for cleaning the drive entity, said cleaning nozzle passing through the spray arm toothed gear.

As cited above, the spray arm toothed gear preferably comprises a multiplicity of teeth, wherein each tooth can have such a cleaning nozzle. However, it is equally possible for only selected teeth of the spray arm toothed gear to have such a cleaning nozzle. For example, the cleaning nozzle is embodied as a hole which passes through the respective tooth of the spray arm toothed gear. By means of the cleaning nozzle, washing liquor and/or fresh water can be sprayed into the gearbox, in particular into the transmission housing of the gearbox, whereby soiling can be cleaned off the cog-wheels of the gearbox. Soiling can thus be rinsed out of the gearbox.

According to a further embodiment variant, the cleaning nozzle is oriented perpendicular to the axis of rotation of the spray arm.

Alternatively, the cleaning nozzle can also be oriented obliquely relative to the axis of rotation of the spray arm. If a plurality of cleaning nozzles are provided, these can be oriented variously in relation to the axis of rotation of the spray arm.

Further possible implementations of the household dishwasher comprise other combinations that are not explicitly cited of features or embodiment variants described in the foregoing or below in relation to the exemplary embodiments. In this way, a person skilled in the art will also add individual aspects as improvements or additions to the respective basic form of the household dishwasher.

BRIEF DESCRIPTION OF THE DRAWINGS

Further advantageous developments and aspects of the household dishwasher are the subject matter of the sub-claims and of the exemplary embodiments described below in respect of the household dishwasher. The household dishwasher is explained in greater detail below with reference to preferred embodiment variants and to the appended figures, in which:

DETAILED DESCRIPTION OF EXEMPLARY EMBODIMENTS OF THE PRESENT INVENTION

Identical or functionally identical elements are denoted by the same reference signs in the figures unless otherwise specified.

Figure 1:
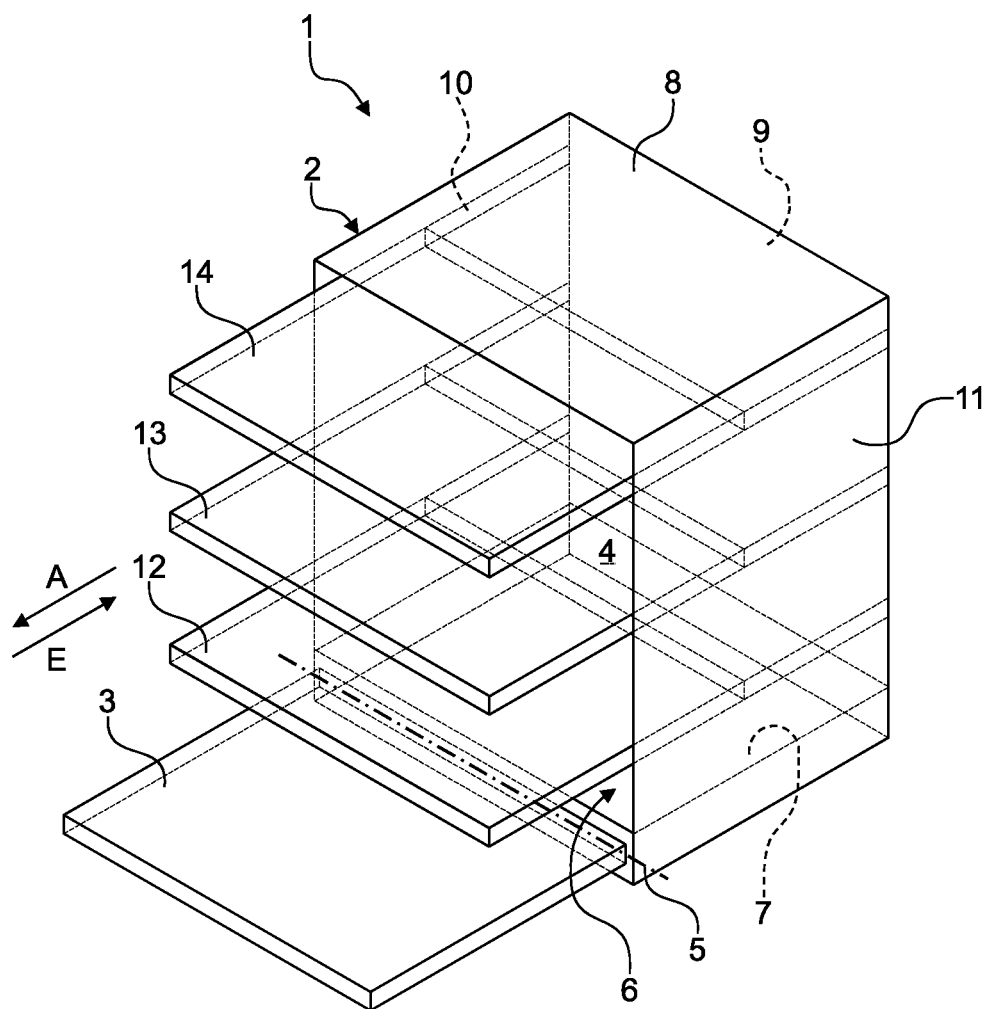
FIG. 1 shows a schematic perspective view of an embodiment variant of a household dishwasher.

FIG. 1 shows a schematic perspective view of an embodiment variant of a household dishwasher 1. The household dishwasher 1 comprises a washing container 2 which can be closed by a door 3, in particular in a watertight manner. A sealing entity can be provided between the door 3 and the washing container 2 for this purpose. The washing container 2 is preferably cuboid. The washing container 2 can be arranged in a housing of the household dishwasher 1. The washing container 2 and the door 3 can form a dishwasher interior 4 for washing a dishwasher load.

The door 3 is illustrated in its open position in FIG. 1. Closing or opening the door 3 can be achieved by swinging about a hinge axis 5 at a lower end of the door 3. A loading access 6 of the washing container 2 can be closed or opened by means of the door 3. The washing container 2 has a bottom 7, a top 8 which is arranged opposite the bottom 7, a back panel 9 which is arranged opposite the closed door 3, and two side panels 10, 11 arranged opposite each other. The bottom 7, the top 8, the back panel 9 and the side panels 10, 11 can be manufactured from a stainless steel sheet, for example. Alternatively, the bottom 7 can be manufactured from a plastic material, for example.

The household dishwasher 1 further comprises at least one dishwasher loading rack 12 to 14. A plurality of dishwasher loading racks 12 to 14 can preferably be provided, e.g. three, wherein the dishwasher loading rack 12 can be a lower dishwasher loading rack or lower basket, the dishwasher loading rack 13 can be an upper dishwasher loading rack or upper basket, and the dishwasher loading rack 14 can be a cutlery drawer. It is also evident in FIG. 1 that the dishwasher loading racks 12 to 14 are arranged one above the other in the washing container 2. Each dishwasher loading rack 12 to 14 can optionally be moved into or out from the washing container 2. In particular, each dishwasher loading rack 12 to 14 can be pushed into or slid into the washing container 2 in a push-in direction E and pulled out or slid out from the washing container 2 in a pull-out direction A which is opposite to the push-in direction E.

Figure 2:
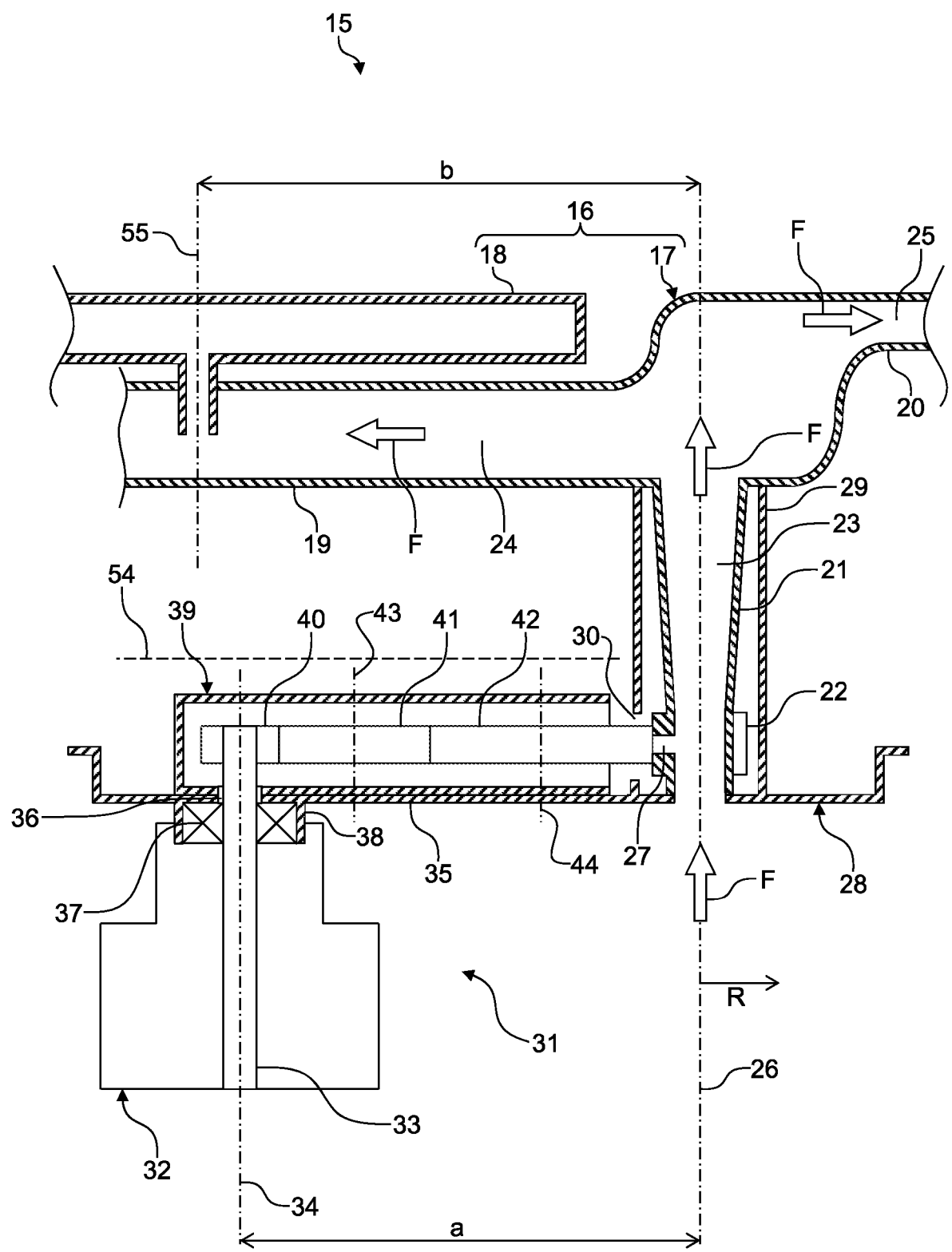
FIG. 2 shows a schematic side view of an embodiment variant of a controlled spray arm or spray device for the household dishwasher according to FIG. 1.

FIG. 2 shows a schematic side view of an embodiment variant of a controlled spray arm or spray device 15 for the household dishwasher 1. The controlled spray arm 15 is arranged within the washing container 2. In particular, the controlled spray arm 15 is positioned below the dishwasher loading rack 12. The controlled spray arm 15 can be positioned at the bottom 7. The controlled spray arm 15 comprises a spray arm 16 for applying washing liquor and/or fresh water F to a dishwasher load (not shown) that is held in the washing container 2. The spray arm 16 comprises an extension piece 17 which is actively driven, and a spray arm satellite 18 which is rotatably mounted on the extension piece 17. The spray arm satellite 18 can have a plurality of arms. For example, the spray arm satellite 18 can have three arms, which are offset by an angle of 120° relative to each other. The extension piece 17 can have spray nozzles (not shown).

The spray arm satellite 18 is not actively driven. This means that the spray arm satellite 18 does not have its own drive entity. In particular, the spray arm satellite 18 is reactively driven by the washing liquor and/or the fresh water F. "Reactively driven" in this context is understood to mean that the spray arm satellite 18 has a plurality of spray nozzles (not shown), through which the washing liquor and/or the fresh water F can exit from the spray arm satellite 18 and cause this to rotate.

The extension piece 17 however, unlike the spray arm satellite 18, is actively driven. The extension piece 17 comprises a first arm 19, on which the spray arm satellite 18 is rotatably mounted, and a second arm 20. The arms 19, 20 can have spray nozzles (not shown). Provision is preferably made for two such arms 19, 20. The number of arms 19, 20 is unlimited. Provision can also be made for precisely one arm 19, 20 or for more than two arms 19, 20.

Both the spray arm satellite 18 and the extension piece 17 are designed to be hollow, so that the washing liquor and/or the fresh water F can flow through the extension piece 17 and the spray arm satellite 18. The arms 19, 20 of the extension piece 17 are connected to a venturi tube or supporting tube 21. The supporting tube 21 is a venturi tube or can be referred to as a venturi tube. The supporting tube 21 can also be referred to as a supporting part. The supporting tube 21 is suitable for supplying the washing liquor and/or the fresh water F to the arms 19, 20. The supporting tube 21 can be designed to be conical. A spray arm toothed gear 22 with a multiplicity of teeth is provided on the supporting tube 21. The arms 19, 20 are manufactured from e.g. polypropylene (PP), in particular glass-fiber reinforced. By contrast, the supporting tube 21 can be manufactured from polyoxymethylene (POM). Therefore the supporting tube 21 can also be referred to as a POM supporting tube or POM supporting part. This means that the supporting tube 21 and the arms 19, 20 can be manufactured from different plastic materials. For example, the arms 19, 20 and the supporting tube 21 can be permanently connected together in a plastic injection molding process with encapsulation of the various plastic materials.

The arms 19, 20 can be designed as a single piece, this being materially integral in particular. "Single piece" in this context means that the arms 19, 20 form a common component and are not composed of different components. "Materially integral" in this context means that the arms 19, 20 are manufactured entirely from the same material. Accordingly, the supporting tube 21 and the spray arm toothed gear 22 can also be designed as a single piece, this being materially integral in particular.

The supporting tube 21 internally comprises a conical or frustum-shaped hollow space 23, through which the washing liquor and/or the fresh water F can flow into hollow spaces 24, 25 of the arms 19, 20. The spray arm 16, in particular the extension piece 17, is assigned an axis of rotation 26 about which the spray arm 16, in particular the extension piece 17, can rotate.

The spray arm toothed gear 22 can have an optional cleaning nozzle 27. The cleaning nozzle 27 can be designed as a hole which passes through a tooth of the spray arm toothed gear 22. However, the cleaning nozzle 27 can also be placed between two teeth of the spray arm toothed gear 22. In particular, the cleaning nozzle 27 is oriented perpendicular to the axis of rotation 26. Each tooth of the spray arm toothed gear 22 can have such a cleaning nozzle 27. Alternatively, such cleaning nozzles 27 can be assigned to only selected teeth of the spray arm toothed gear 22. The cleaning nozzle 27 does not necessarily have to pass through the spray arm toothed gear 22. The cleaning nozzle 27 can be positioned in the region of the spray arm toothed gear 22. For example, the cleaning nozzle 27 can also be placed above or below the spray arm toothed gear 22 in the orientation according to FIG. 2.

The controlled spray arm 15 further comprises a sump 28. The sump 28 is preferably a plastic injection-molded component. The sump 28 has a sump dome 29 which is tubular. The sump dome 29 extends towards the top 8. The supporting tube 21 is held in the sump dome 29 and is rotatably mounted. The manner in which the supporting tube 21 is mounted in the sump dome 29 is not shown in FIG. 2, however.

The sump dome 29 comprises a radial aperture 30. "Radial" here is understood to refer to a radial direction R of the sump dome 29. The radial direction R is oriented away from and perpendicular to the axis of rotation 26. The aperture 30 therefore penetrates the sump dome 29 in the radial direction R. Positive engagement into the spray arm toothed gear 22 is possible through the aperture 30, as explained below. The aperture 30 can be rectangular.

The controlled spray arm 15 further comprises a drive entity 31 for actively driving the spray arm 16. The drive entity 31 comprises a drive element 32, in particular an electric motor, with a drive shaft 33 which rotates about an axis of rotation 34 during operation of the drive entity 31. "Actively driven" in this context therefore means that the spray arm 16 is caused to rotate by means of the drive element 32 and not e.g. by means of spray nozzles. The axis of rotation 34 of the drive shaft 33 and the axis of rotation 26 of the spray arm 16 are arranged parallel to each other and separated from each other by a distance a.

The drive shaft 33 is fed through a hole 36 provided in a plate-shaped base section 35 of the sump 28. The sump dome 29 also projects from said base section 35. The drive shaft 33 is sealed in a fluid-impermeable manner relative to a cylindrical locating section 38 of the sump 28 by means of a sealing element 37, in particular by means of a shaft sealing ring.

The drive entity 31 further comprises a gearbox 39 for transferring rotational moment from the drive shaft 33 to the spray arm 16, in particular to the spray arm toothed gear 22 of the extension piece 17. The gearbox 39 can also be referred to as a transmission module or transmission unit. The gearbox 39 can comprise straight-cut or helical cog-wheels 40 to 42, a bevel gear, a belt drive or a chain drive. The cog-wheels 40 to 42 bridge the distance a between the drive shaft 33, in particular the axis of rotation 34, and the spray arm 16, in particular the axis of rotation 26. The number of cog-wheels 40 to 42 is unlimited in principle.

A first cog-wheel 40 is coupled to the drive shaft 33 in a rotationally conjoint manner, for example. The drive shaft 33 can be laterally flattened or milled off for this purpose. The first cog-wheel 40 can have a corresponding hole with a corresponding geometry, so that the first cog-wheel 40 and the drive shaft 33 engage positively with each other. A positive connection is produced by the interlocking or catching of at least two connection partners. A second cog-wheel 41 is preferably rotatably mounted in the gearbox 39 and rotates about an axis of rotation 43. A third cog-wheel 42 is preferably likewise rotatably mounted in the gearbox 39 and rotates about an axis of rotation 44. The third cog-wheel 42 engages with the spray arm toothed gear 22, the second cog-wheel 41 being disposed between the cog-wheels 40, 42. The axes of rotation 26, 34, 43, 44 are arranged parallel to each other and at a distance from each other.

Figure 3:
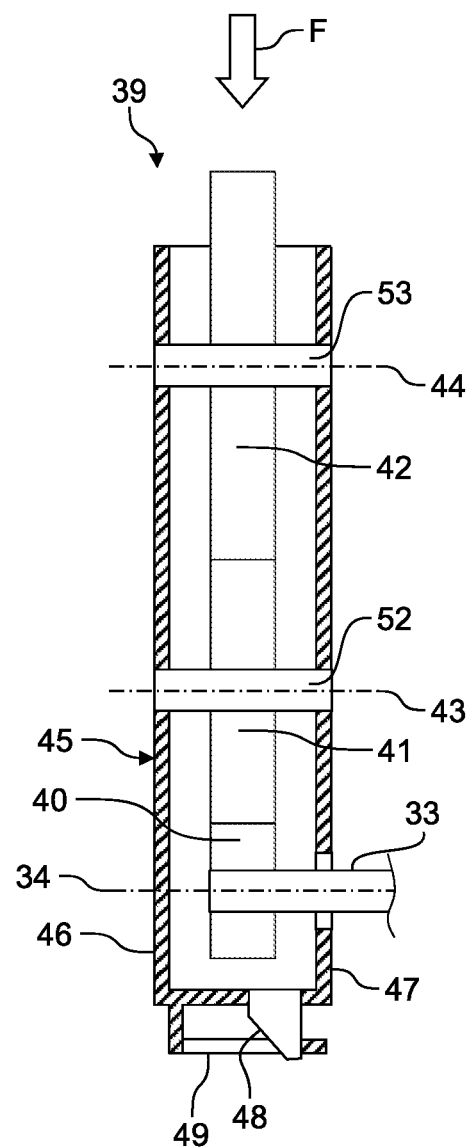
FIG. 3 shows a schematic side view of an embodiment variant of a gearbox for the spray device according to FIG. 2.
Figure 4:
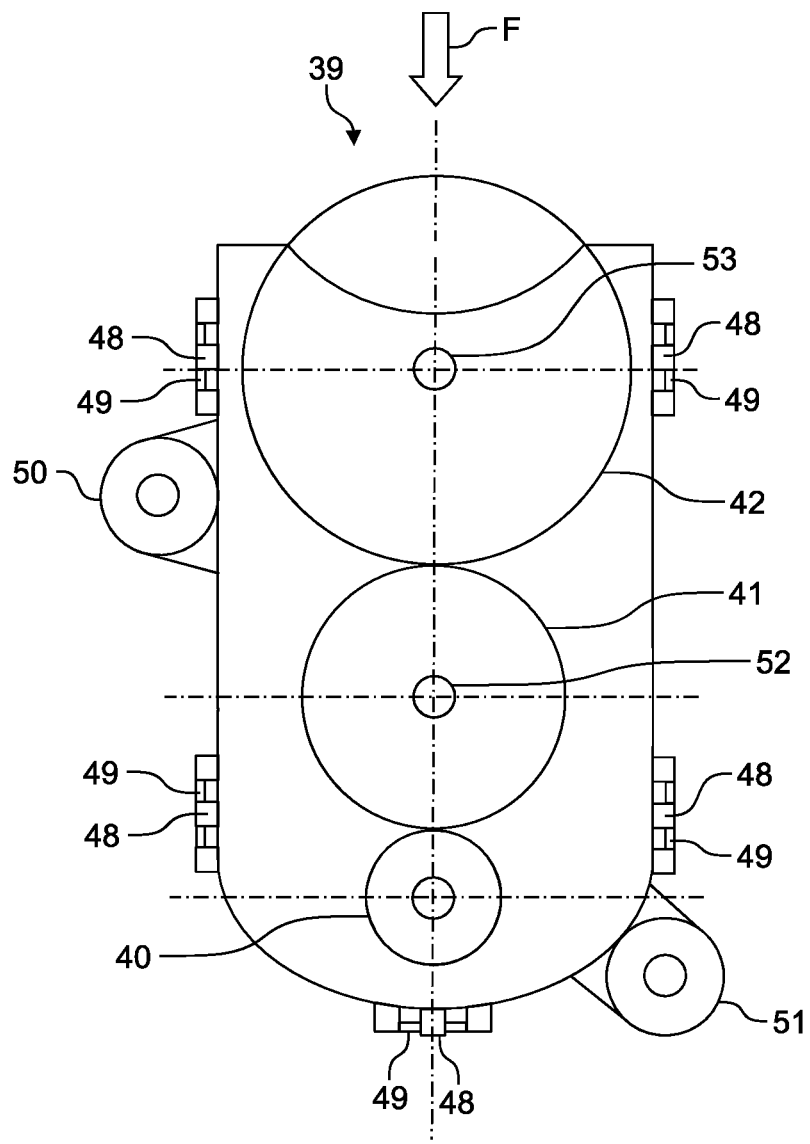
FIG. 4 shows a schematic plan view of the gearbox according to FIG. 3.

FIG. 3 shows a schematic side view of an embodiment variant of the gearbox 39. FIG. 4 shows a schematic plan view of the gearbox 39. Reference is made concurrently to both FIG. 3 and FIG. 4 in the following.

The gearbox 39 comprises a transmission housing 45 in which the cog-wheels 40 to 42 are held. In particular, the transmission housing 45 has an upper housing part 46 and a lower housing part 47. In this case, the upper housing part 46 is positively connected to the lower housing part 47. For example, on the lower housing part 47, provision can be made in this context for snap-in hooks 48 which can engage into corresponding seats 49 that are provided on the upper housing part 46. The seats 49 can be provided as apertures, for example.

The lower housing part 47 can also have mounting eyelets 50, 51 by means of which the gearbox 39 can be screwed to the sump 28. The transmission housing 45 is fluid-permeable. This means that washing liquor and/or fresh water F can flow through the transmission housing 45. By means of the cleaning nozzle 27, it is possible in particular to produce a spray jet away from the axis of rotation 26 and into the transmission housing 45. The gearbox 39 can be cleaned of soiling and flushed thereby. To this end, the transmission housing 45 has corresponding outlet openings for the washing liquor and/or the fresh water F.

As cited above, the cog-wheels 40 to 42 are rotatably mounted in the gearbox 39, in particular in the transmission housing 45. To this end, axles 52, 53 which are mounted in the transmission housing 45, in particular in the upper housing part 46 and in the lower housing part 47, can be provided for the cog-wheels 41, 42. The first cog-wheel 40 is fastened to the drive shaft 33. The first cog-wheel 40 is mounted in the upper housing part 46 and in the lower housing part 47. The axles 52, 53 can be cylindrical bolts or pins, for example.

Returning to FIG. 2, the sump 28 is assigned a filter system 54 below which the gearbox 39 is arranged. This means that the gearbox 39 is positioned between the base section 35 of the sump 28 and the filter system 54. Soiling of the gearbox 39 can be prevented thereby. The filter system 54 can be a multipart system and can comprise a fine filter and a coarse filter.

The functionality of the controlled spray arm 15 is explained in the following. During operation of the household dishwasher 1, the washing liquor and/or the fresh water F is transported by means of a circulating pump (not shown) and supplied to the spray arm 16. The washing liquor and/or the fresh water F is supplied via the extension piece 17 to the spray arm satellite 18. This is caused to rotate about an axis of rotation 55 as a result of the washing liquor and/or the fresh water F emerging from the spray nozzles (not shown). The axis of rotation 55 is arranged at a distance b from the axis of rotation 26 and is parallel thereto. The spray arm 16 itself is caused to rotate about the axis of rotation 26 by means of the drive entity 31. The rotational speed of the extension piece 17 can be determined as desired in this case. The rotational speed of the extension piece 17 can also vary during a wash program. The extension piece 17 can also pause in a preselected position, in order to realize an intensive washing zone to which washing liquor and/or fresh water F is applied by the spray arm satellite 18 without the extension piece 17 rotating.

It is thus possible to achieve a compact, dirt-resistant and robust design of the gearbox 39 as a preassembly. In contrast with a direct drive of the spray arm 16, the washing liquor and/or fresh water F flowing from the circulating pump to the spray arm 16 is does not experience any deflection and, in contrast with a direct drive, the supporting tube 21 can be kept free of elements that are required for the drive. This offers hydraulic advantages over a direct drive. A "direct drive" in this context is understood to mean a system in which a drive element, e.g. an electric motor, drives a spray arm directly and in particular without intermediate cog-wheels or a gear set. Due to the location of the gearbox 39 below the filter system 54, the gearbox 39 is protected against at least coarse particles of dirt. With the aid of the cleaning nozzle 27, the gearbox 39 can be flushed and cleaned by an appropriate leakage amount of washing liquor and/or fresh water F. Any blockage of the cog-wheels 40 to 42 can be reliably prevented thereby. Furthermore, the washing liquor and/or fresh water F can also serve to lubricate and maintain the temperature of the cog-wheels 40 to 42.

Although the present invention is described with reference to exemplary embodiments, it can be modified in many different ways.

The invention claimed is:

1. A household dishwasher, comprising:
a washing container for holding a dishwasher load;
a spray arm for applying washing liquor and/or fresh water to the dishwasher load, wherein the spray arm comprises a supporting tube, wherein the spray arm is rotatable via the supporting tube, and wherein supporting tube is mounted for rotation about an axis of rotation; and
an electric motor for actively driving the spray arm, wherein the electric motor is arranged at a distance from the supporting tube, and wherein the electric motor comprises a drive shaft that is mounted for rotation about an axis of rotation which extends in parallel relation to and at the distance from the axis of rotation of the supporting tube.

2. The household dishwasher of claim 1, wherein the spray arm further comprises an extension piece which is connected to the supporting tube that is actively driven by the electric motor, and a spray arm satellite which is rotatably mounted on the extension piece and is reactively driven by the washing liquor and/or of the fresh water.

3. The household dishwasher of claim 1, wherein the electric motor comprises a gearbox for transferring a rotational moment from the drive shaft to the supporting tube.

4. The household dishwasher of claim 3, wherein the gearbox comprises straight-cut or helical cog-wheels, a bevel gear, a belt drive or a chain drive.

5. The household dishwasher of claim 3, wherein the gearbox comprises a plurality of cog-wheels, which bridge a distance between the drive shaft and the supporting tube.

6. The household dishwasher of claim 3, wherein the gearbox comprises a transmission housing and a plurality of cog-wheels which are held in the transmission housing.

7. The household dishwasher of claim 6, wherein the cog-wheels are rotatably mounted in the transmission housing.

8. The household dishwasher of claim 6, wherein the transmission housing comprises an upper housing part and a lower housing part, said upper housing part being positively connected to the lower housing part.

9. The household dishwasher of claim 6, wherein the transmission housing is configured to be fluid-permeable.

10. The household dishwasher of claim 3, further comprising a filter system, said gearbox being arranged below the filter system.

11. The household dishwasher of claim 3, wherein the supporting tube comprises a spray arm toothed gear into which the electric motor positively engages for transferring the rotational moment.

12. The household dishwasher of claim 11, further comprising a sump which includes a tubular sump dome, in or on which the spray arm is rotatably mounted, said sump dome having a radial aperture via which the electric motor positively engages into the spray arm toothed gear for transferring the rotational moment.

13. The household dishwasher of claim 11, wherein the spray arm further comprises a cleaning nozzle for cleaning the electric motor, said cleaning nozzle configured for passage through the spray arm toothed gear.

14. The household dishwasher of claim 13, wherein the cleaning nozzle is arranged perpendicular to the axis of rotation of the spray arm.

15. The household dishwasher of claim 1, further comprising a sump on which the spray arm is mounted and to which the electric motor is fastened.

16. A controlled spray arm for a household dishwasher having a wash container, comprising:
a spray arm for applying washing liquor and/or fresh water to a dishwasher load, wherein the spray arm comprises a supporting tube, wherein the spray arm is rotatable via the supporting tube, and wherein the supporting tube is mounted for rotation about an axis of rotation; and
an electric motor for actively driving the spray arm, wherein the electric motor is arranged at a distance from the supporting tube, and wherein the electric motor comprises a drive shaft that is mounted for rotation about an axis of rotation which extends in parallel relation to and at the distance from the axis of rotation of the supporting tube.

17. The controlled spray arm of claim 16, wherein the spray arm further comprises an extension piece which is connected to the supporting tube that is actively driven by the electric motor, and a spray arm satellite which is rotatably mounted on the extension piece and is reactively driven by the washing liquor and/or of the fresh water.

18. The controlled spray arm of claim 16, wherein the electric motor comprises a gearbox for transferring a rotational moment from the drive shaft to the supporting tube.

19. The controlled spray arm of claim 18, wherein the gearbox comprises straight-cut or helical cog-wheels, a bevel gear, a belt drive or a chain drive.

20. The controlled spray arm of claim 18, wherein the gearbox comprises a plurality of cog-wheels, which bridge a distance between the drive shaft and the supporting tube.

21. The controlled spray arm of claim 18, wherein the gearbox comprises a transmission housing and a plurality of cog-wheels which are held in the transmission housing.

22. The controlled spray arm of claim 21, wherein the cog-wheels are rotatably mounted in the transmission housing.

23. The controlled spray arm of claim 21, wherein the transmission housing comprises an upper housing part and a lower housing part, said upper housing part being positively connected to the lower housing part.

24. The controlled spray arm of claim 21, wherein the transmission housing is configured to be fluid-permeable.

25. The controlled spray arm of claim 18, further comprising a filter system, said gearbox being arranged below the filter system.

26. The controlled spray arm of claim 18, wherein the supporting tube comprises a spray arm toothed gear into which the electric motor positively engages for transferring the rotational moment.

27. The controlled spray arm of claim 26, further comprising a sump which includes a tubular sump dome, in or on which the spray arm is rotatably mounted, said sump dome having a radial aperture via which the electric motor positively engages into the spray arm toothed gear for transferring the rotational moment.

28. The controlled spray arm of claim 26, wherein the spray arm further comprises a cleaning nozzle for cleaning the electric motor, said cleaning nozzle configured for passage through the spray arm toothed gear.

29. The controlled spray arm of claim 28, wherein the cleaning nozzle is arranged perpendicular to the axis of rotation of the spray arm.

30. The controlled spray arm of claim 16, further comprising a sump on which the spray arm is mounted and to which the electric motor is fastened.

* * * * *